(12) United States Patent
Hall et al.

(10) Patent No.: US 7,600,376 B2
(45) Date of Patent: Oct. 13, 2009

(54) ENERGY STORAGE

(76) Inventors: David R. Hall, 2185 S. Larsen Pkwy., Provo, UT (US) 84606; Francis Leany, 2185 S. Larsen Pkwy., Provo, UT (US) 84606; David Wahlquist, 2185 S. Larsen Pkwy., Provo, UT (US) 84606; Scott Dahlgren, 2185 S. Larsen Pkwy., Provo, UT (US) 84606

( * ) Notice: Subject to any disclaimer, the term of this patent is extended or adjusted under 35 U.S.C. 154(b) by 288 days.

(21) Appl. No.: 11/772,334

(22) Filed: Jul. 2, 2007

(65) Prior Publication Data

US 2009/0007558 A1    Jan. 8, 2009

(51) Int. Cl.
*F15B 15/00* (2006.01)
(52) U.S. Cl. ............................. 60/413; 92/92
(58) Field of Classification Search .................. 60/413; 92/90, 92
See application file for complete search history.

(56) References Cited

U.S. PATENT DOCUMENTS

| | | | |
|---|---|---|---|
| 3,661,327 A | 5/1972 | Adamson | |
| 3,938,841 A | 2/1976 | Glance | |
| 4,098,083 A | 7/1978 | Carman | |
| 4,257,499 A | 3/1981 | Deschner | |
| 4,479,356 A | 10/1984 | Gill | |
| 4,616,392 A | 10/1986 | Snyder | |
| 4,784,362 A | 11/1988 | Wang | |
| 4,848,210 A | 7/1989 | Bissonnette | |
| 5,067,390 A * | 11/1991 | Negishi | 92/92 |
| 5,158,005 A * | 10/1992 | Negishi et al. | 92/92 |
| 5,201,262 A * | 4/1993 | Negishi et al. | 92/92 |
| 5,254,243 A | 10/1993 | Carr | |
| 5,263,401 A | 11/1993 | Walker | |
| 5,277,683 A * | 1/1994 | Wilkins | 482/129 |
| 5,509,938 A | 4/1996 | Phillips | |
| 5,511,759 A | 4/1996 | DeKraker | |
| 5,579,640 A | 12/1996 | Gray | |
| 6,146,114 A | 11/2000 | Nardacci | |
| 6,296,299 B1 | 10/2001 | Hanakawa | |
| 6,468,315 B1 | 10/2002 | Wilkinson | |
| 6,666,127 B2 * | 12/2003 | Peles | 92/90 |
| 7,100,895 B2 | 9/2006 | Schurz | |
| 7,104,052 B1 * | 9/2006 | Hindman | 60/413 |
| 7,121,089 B2 * | 10/2006 | Tosen et al. | 60/413 |
| 2004/0173396 A1 | 9/2004 | Rush | |

* cited by examiner

*Primary Examiner*—Thomas E Lazo
(74) *Attorney, Agent, or Firm*—Tyson J. Wilde; Benjamin T. Miskin

(57) ABSTRACT

A system for performing work having a hydraulic circuit has a length of hose, a hydraulic fluid in the circuit in communication with the hose and with a hydraulic actuator for doing the work, and a mechanism for pressurizing the hydraulic circuit such that at least 50 foot pounds of energy is stored within the hose to perform the work.

21 Claims, 11 Drawing Sheets

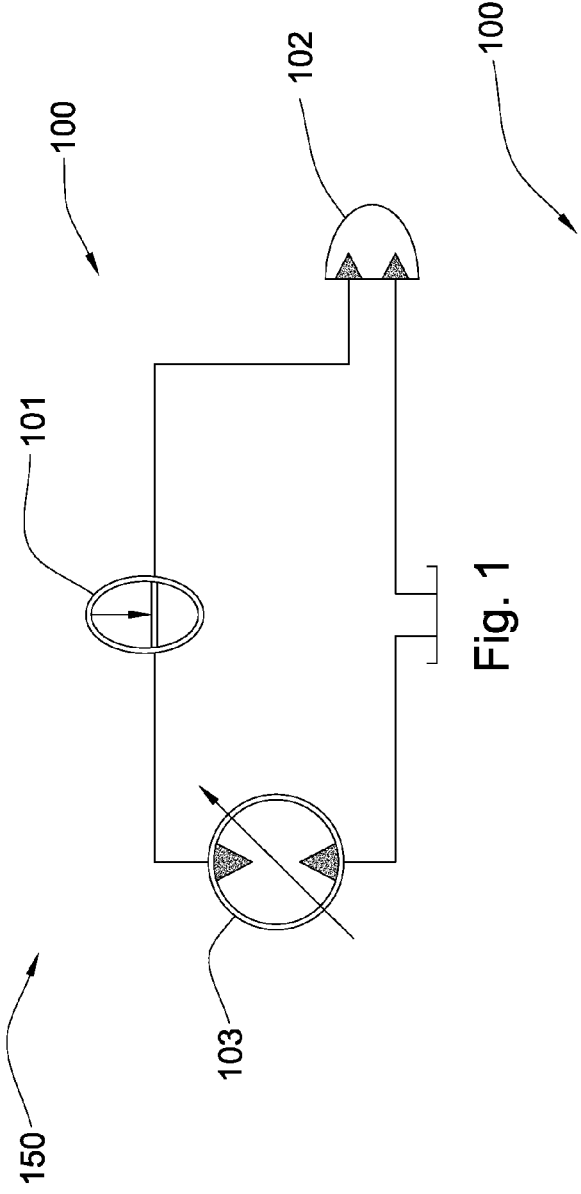
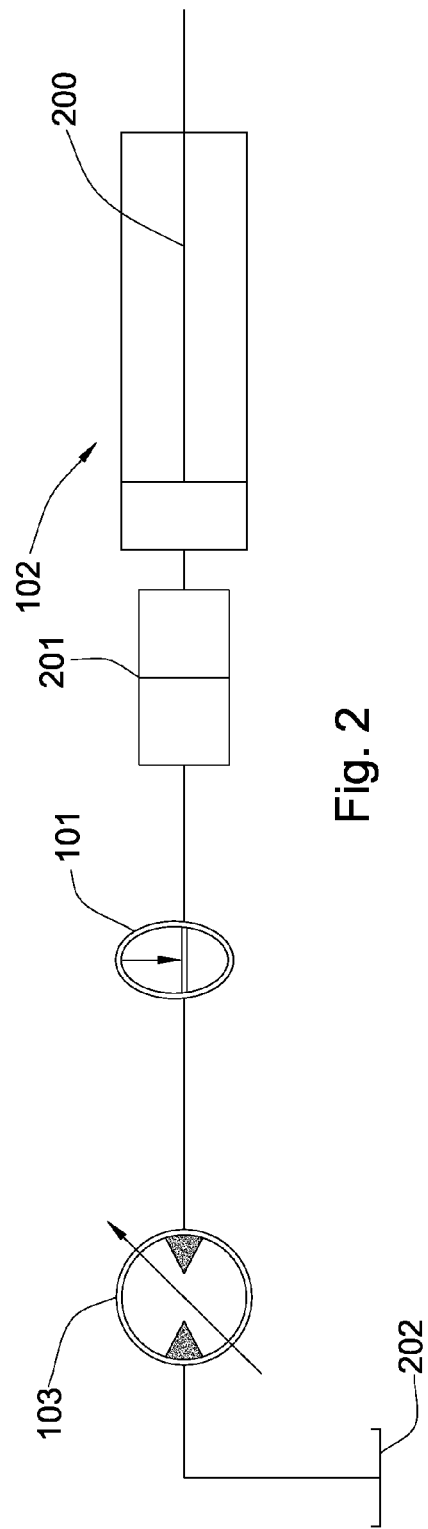

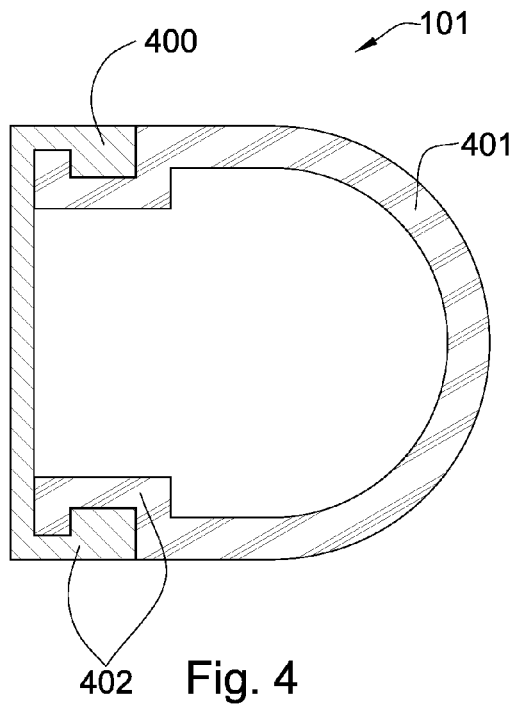
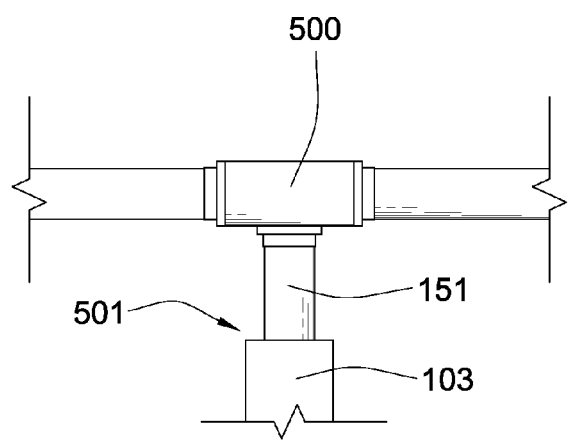
Fig. 4    Fig. 5
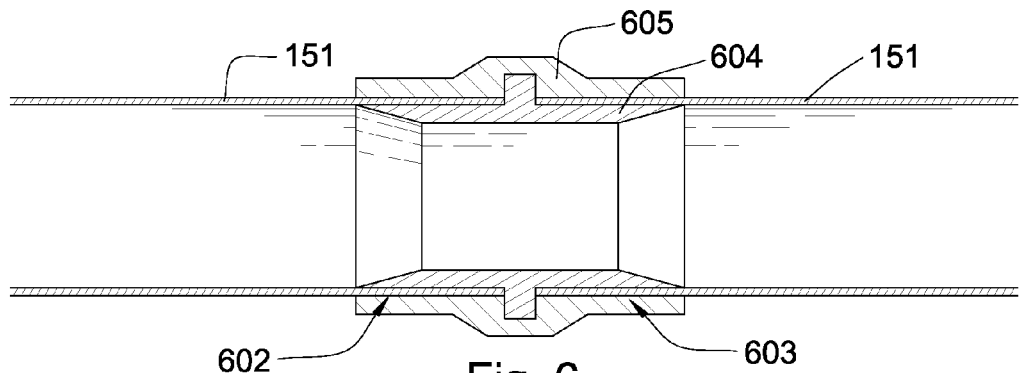
Fig. 6
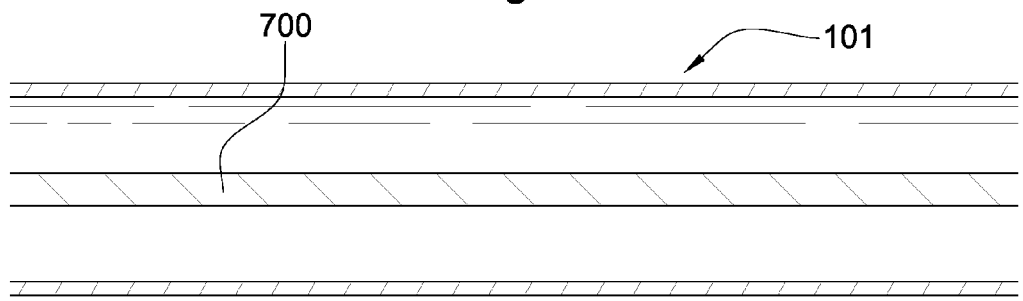
Fig. 7

1900

1905 Provide a hydraulic circuit comprising a length of hose;

1910 Provide a hydraulic fluid in the circuit in communication with the hose and with a hydraulic actuator for doing the work;

1915 Provide a mechanism for pressurizing the hydraulic circuit;

1920 Pressurize the hydraulic circuit such that at least 50 foot pounds of energy is stored within the hose to perform the work.

Fig. 19

ENERGY STORAGE

BACKGROUND OF THE INVENTION

The current invention relates to hydraulic systems for performing work. Hydraulic systems are used in many different applications such as automobiles, trucks, construction equipment, elevators, submarines, and many others. Hydraulic systems may be used to improve such areas as fuel efficiency and power output of mechanical systems which require energy to perform various forms of work, such as lifting payloads, propelling vehicles, or raising elevators. In some applications, it may be desirous to have energy storage in the hydraulic system to provide extra energy when needed.

In hydraulic circuits, hydraulic accumulators have been used to store excess hydraulic fluid. These hydraulic accumulators may comprise an elastic bladder within a rigid chamber. A compressible medium such as a gas may be disposed within the chamber outside of the elastic bladder, while the hydraulic fluid may be disposed within the elastic bladder. When the volume of hydraulic fluid in the bladder increases, the bladder compresses against the compressible medium thereby generating a potential energy within the rigid chamber which is stored outside of the elastic bladder.

An example of such is U.S. Pat. No. 4,166,478 to Sugimura et al., which is herein incorporated by reference for all that it contains, and discloses a hydropneumatic accumulator comprising a rigid upright vessel, the mouth of which is at the bottom, containing an inverted bag-like bladder. The mouths of the vessel and the bladder are sealed to one another. The bladder extends upwardly within the vessel interior and divides the same into inner and outer compartments which respectively contain an incompressible liquid medium and a compressible gaseous medium. Diaphragm and piston accumulators are also common.

BRIEF SUMMARY OF THE INVENTION

In one aspect of the invention, a system for performing work has a hydraulic circuit having a length of hose adapted to store at least 50 foot pounds of energy within the hose. A hydraulic fluid in the circuit is in communication with the hose and with a hydraulic actuator for doing the work. The system also includes a mechanism for pressurizing the hydraulic circuit in order to perform the work.

The hydraulic actuator may be a rotary mechanism. The rotary mechanism may comprise a cam shaft, a turbine, a hydraulic motor, a pump, or a combination thereof. The hydraulic actuator may comprise a piston. The mechanism for pressurizing the hydraulic circuit may be a valve, a motor, a pump, a variable displacement pump, an engine, or a combination thereof.

The system may be incorporated into an automobile. The system may be incorporated in a golf cart, a truck, an elevator, a backhoe, a bulldozer, a trencher, a milling machine, a boat, construction equipment, or a combination thereof.

The length of hose may be at least 50 cumulative feet. The hose may comprise segments. The hose may comprise a rigid portion. The hose may be inflated with the hydraulic fluid to over 1,000 psi. The hose may be inflated with the hydraulic fluid to over 5,000 psi. The hose may comprise a material made of a woven fiber. The hose may comprise a material selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, and a combination thereof. A material of the hose may store at least 50% of the energy. A material of the hose may store at least 75% of the energy. The hydraulic fluid may be incompressible. The hydraulic fluid may be compressible. At least 10% of the energy may be stored in the hydraulic fluid. The energy may be at least 100 foot pounds. The energy may be at least 500 foot pounds.

In another aspect of the invention, a method for performing work may comprise the steps of providing a hydraulic circuit comprising a length of hose; providing a hydraulic fluid in the circuit in communication with the hose and with a hydraulic actuator for doing the work; providing a mechanism for pressurizing the hydraulic circuit; and pressurizing the hydraulic circuit such that at least 50 foot pounds of energy is stored within the hose to perform the work.

With respect to this application, storing energy within the hose means storing energy within a material that makes up hose and/or a material within the hose, such as a hydraulic fluid. The hydraulic may be any type of liquid including oil based liquids, water based liquids, glycols, or combinations thereof.

BRIEF DESCRIPTION OF THE DRAWINGS

FIG. 1 is a schematic diagram of an embodiment of a hydraulic circuit.

FIG. 2 is a schematic diagram of another embodiment of a hydraulic circuit.

FIG. 4 is a cross-sectional diagram of an embodiment of a hose.

FIG. 5 is an orthogonal diagram of an embodiment of a plurality of hose sections.

FIG. 6 is a cross-sectional diagram of another embodiment of a plurality of hose sections.

FIG. 7 is a cross-sectional diagram of another embodiment of a hose.

FIG. 19 is a flowchart diagram of a method for performing work.

DETAILED DESCRIPTION OF THE INVENTION AND THE PREFERRED EMBODIMENT

Figure 3:
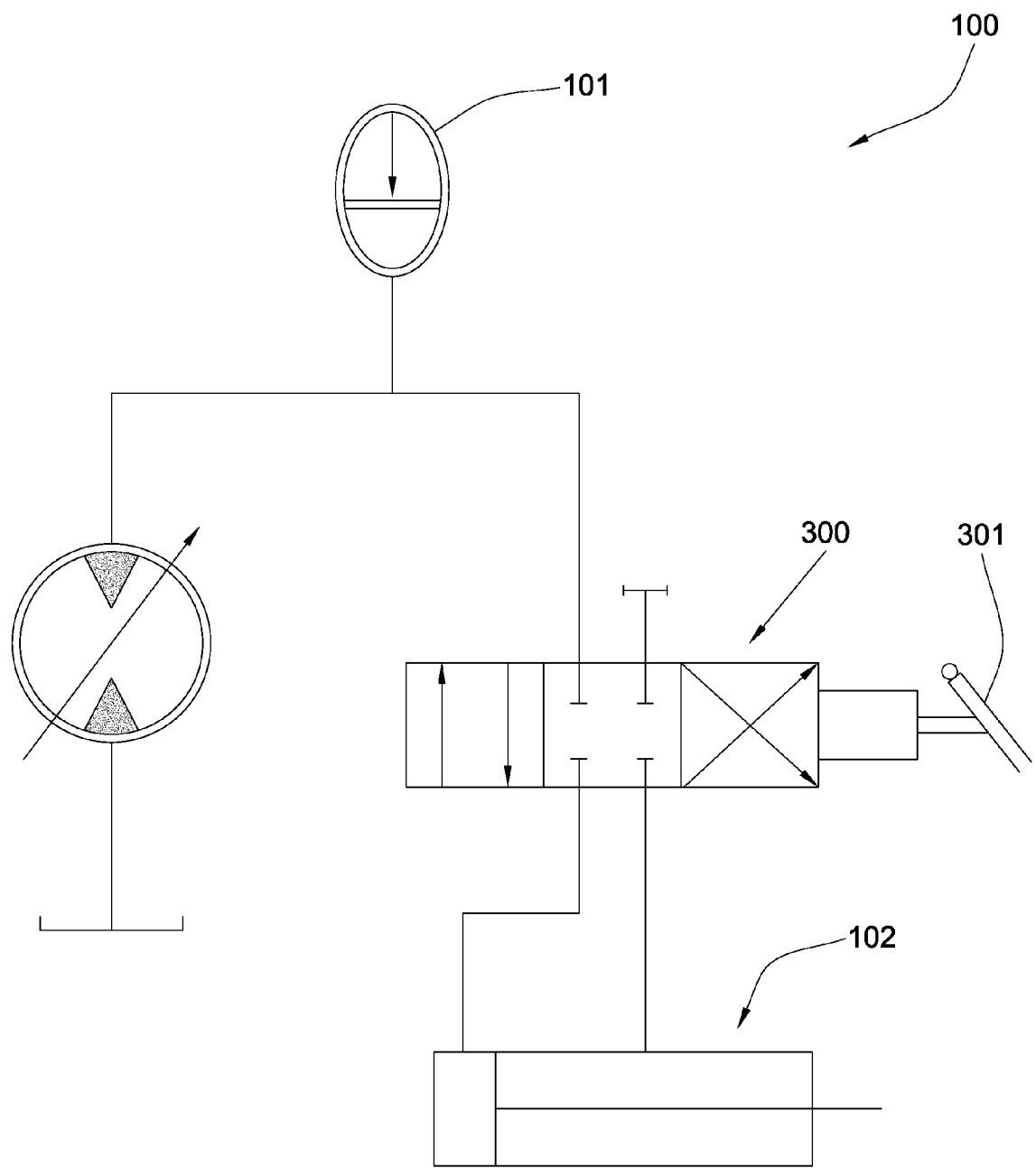
FIG. 3 is a schematic diagram of another embodiment of a hydraulic circuit.

The embodiment of FIG. 1 discloses a schematic of a hydraulic circuit 100 for an energy storage system 150 designed to store energy within a length of hose 101 of the circuit for performing work. A hydraulic fluid in the circuit is in communication with the hose 101 and with a hydraulic actuator 102 for doing the work. The hose 101 is adapted to store energy when inflated with the hydraulic fluid. At least 50 foot pounds of energy may be stored within the hose 101. In some embodiments the hose may be adapted to store at least 100 foot pounds of energy, and in yet other embodiments the hose 101 may be adapted to store at least 500 foot pounds of energy. In some embodiments, the hose is adapted to store at least 100,000 foot pounds of energy. In yet other embodiments, the hose is adapted to store at least 400,000 foot pounds of energy.

The energy may be stored in a material of the hose 101 or in the hydraulic fluid in communication with the hose 101. In some embodiments of the current invention the hydraulic fluid may be compressible, wherein at least 10% of the energy may be stored in the hydraulic fluid. At least 50% of the energy may be stored in the material, and in other embodiments, at least 75% of the energy may be stored in the material. In embodiments where the hydraulic fluid is incompressible, all or substantially all of the energy may be stored in the material. The material may be selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, and a combination thereof. The material may be able to withstand large amounts of pressure due to forces exerted on the hose by the hydraulic fluid—to over 1,000 psi in some embodiments, or over 5,000 psi in other embodiments. Yet in other embodiments, the material may be able to withstand over 10,000 psi. The material may be made of a woven fiber. The weave may in part determine the flexibility and/or elasticity of the hose 101. In some embodiments, a liner, or mesh material embedded in the hose wall may also affect the flexibility of the hose.

The circuit 100 also comprises a mechanism 103 for inflating the hose 101 with the hydraulic fluid and pressurizing the hydraulic circuit 100. The mechanism 103 may be a valve, a motor, a pump, a variable displacement pump, an engine, or a combination thereof. When the mechanism 103 is activated, it may cause fluid to flow into the hose 101, thereby pressurizing it. The hose 101 may store the energy and/or release it into the hydraulic actuator 102. The hydraulic actuator 102 may be a rotary mechanism, as in FIG. 1, including a cam shaft, a turbine, a hydraulic motor, a pump, or a combination thereof. The hose 101 may release the energy while the mechanism 103 is operating in order to provide an additional burst of energy in applications where the motor alone may not provide enough energy for operation of the actuator 102. In some embodiments, the motor is decoupled from the hydraulic actuator which is in communication with the hose and the hose supplies the hydraulic actuator with the energy.

The hydraulic actuator 102 may comprise a piston 200, as in the embodiment of FIG. 2. The hydraulic circuit 100 may also comprise a valve 201, such as a two-way valve, which may allow the mechanism to more efficiently pressurize the hose 101. The valve 201 may close such that while the mechanism 103 is in operation no fluid is released to the hydraulic actuator, and instead simply pressurizes the hose 101. When the valve 201 opens, the energy stored within the hose 101 may be released to the actuator 102, causing the piston 200 to extend. External forces may cause the piston 200 to return to an original state, pushing the fluid back through the valve 201 and into the hose 101. The mechanism 103 may draw fluid from a reservoir 202 to pressurize the hose 101, and may return the fluid to the reservoir 202.

The hydraulic circuit 100 may comprise a spool valve 300, as in the embodiment of FIG. 3, which may allow for hydraulic energy from the hose 101 to be applied to the actuator 102 in both directions, depending on the position of the spool valve 300, rather than relying on external forces to return the actuator 102 to the original position. The spool valve 300 may be controlled by a user-operated device such as a mechanical lever 301. The spool valve 300 may also be controlled by electronic equipment adapted to monitor the fluid flow through the circuit 100 and/or operation of the hydraulic actuator 102.

The hose 101 may comprise a rigid portion 400 in addition to an elastic portion 401 comprising energy-storing material as in the embodiment of FIG. 4. The rigid portion 400 may provide strength to the hose 101, while the elastic portion 401 still allows the hose 101 to store energy. The rigid portion 400 may be made of metal or other rigid material. The two portions 400, 401 of hose 101 may be interlocked by tabs 402. As the elastic portion 401 expands due to an increasing volume of hydraulic fluid within the hose 101, the tabs 402 may allow the two portions 400, 401 to hold tightly together such that all of the hydraulic fluid is contained entirely within the hose 101.

The energy storing system may comprise a plurality of hoses segments 151 connected by a manifold 500, as in the embodiment of FIG. 5. The hoses 101 may be attached to the manifold 500 such that they are in fluid communication with each other. The pressurizing mechanism 103 may be attached to an end 501 of one of the hose segments 151 such that the mechanism 103 pressurizes the entire hose 101. This may allow for the hydraulic circuit 100 to comprise more than one hydraulic actuator 102 in communication with the hose 101.

As in the embodiment of FIG. 6, the hose 101 may comprise a plurality of hose segments 151, such that the hose 101 may extend farther or may have more energy storage potential. The hose segments 151 may be held together with a clamp 601 at ends 602, 603 of each segment 151. The ends 602, 603 may be fitted around an inner element 604 of the clamp 601, after which an outer element 605 of the clamp 601 may be fitted around the hose 101 and inner element 604. A rigid element 700 may also be disposed within the hose 101, as in the embodiment of FIG. 7. The rigid element 700 may be for stability, or it may also be a fluid conduit such that the energy storage system 105 may comprise more than one fluid line. The fluid in the hose 101 and the rigid element 700 may be at different pressures.

Figure 8:
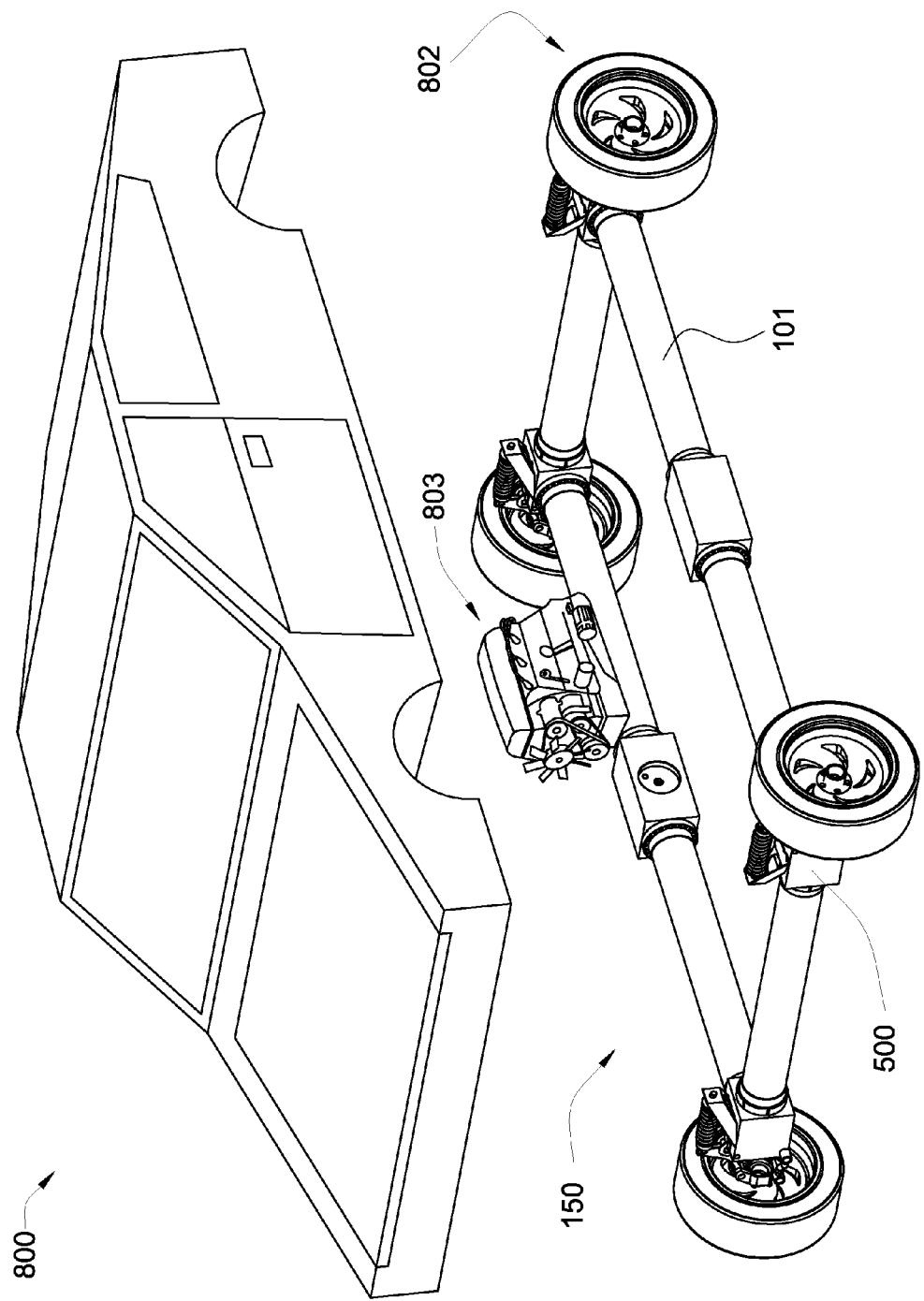
FIG. 8 is an exploded diagram of an embodiment of an automobile.
Figure 9:
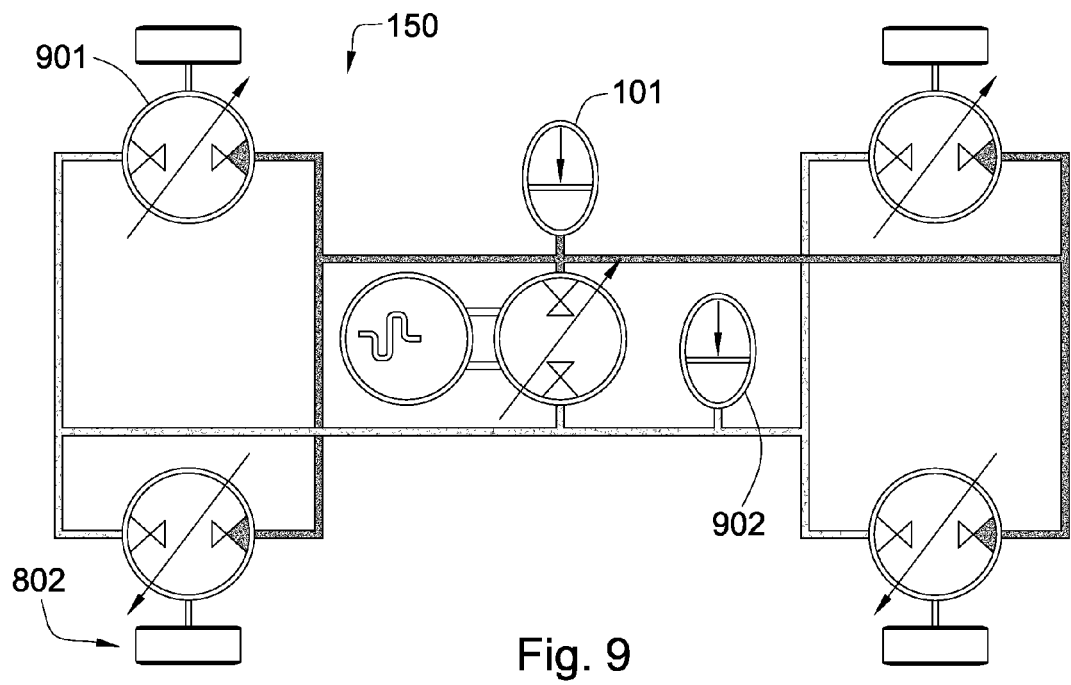
FIG. 9 is a schematic diagram of another embodiment of a hydraulic circuit.

The current invention may be incorporated into a vehicle 800 such as an automobile, as in the embodiment of FIG. 8. A plurality of hose segments 151 may be incorporated into the energy storage system 150, connected by a plurality of manifolds 500. The manifolds 500 may be proximate translation assemblies 802 or an engine 803. The engine 803 may power the pressurizing mechanism 103. The translation assemblies 802 may be in mechanical communication with individual hydraulic actuators 102 disposed within the manifolds 500.

FIGS. 9 through 12 disclose embodiments of hydraulic schematics of the energy storage system 150 in a vehicle 800. The hose 101 may be in hydraulic communication with a plurality of pumps 901. The energy storage system 150 may propel the vehicle 800 forward using the pumps 901 at each translation assembly 802, as in FIG. 9, especially for propelling the vehicle 800 from rest. A low pressure fluid source 902 may also be in hydraulic communication with the pumps 901. Additional fluid may be stored in either the hose 101 or the low pressure fluid source 902.

Figure 10:
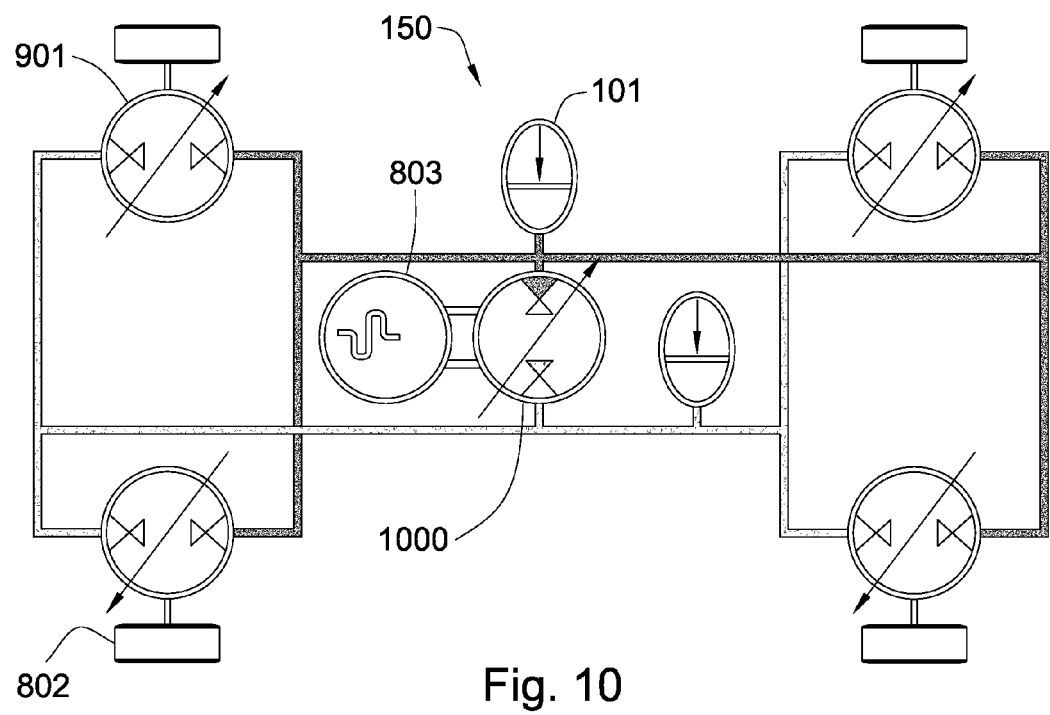
FIG. 10 is a schematic diagram of another embodiment of a hydraulic circuit.
Figure 11:
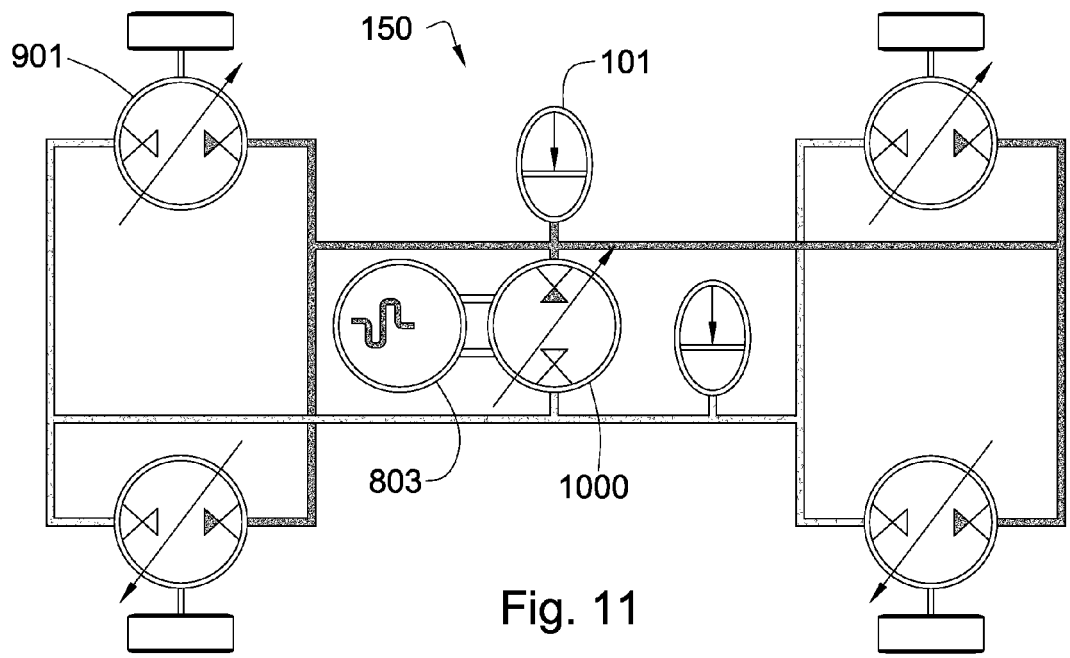
FIG. 11 is a schematic diagram of another embodiment of a hydraulic circuit.

The energy storage system 150 may comprise an engine pump 1000 adapted to start the engine 803, as in the schematic of FIG. 10. Once the vehicle 800 reaches a predetermined velocity or the hose 101 gets below a predetermined pressure, the pumps 901 proximate the translation assemblies 802 may switch to the neutral position and the engine pump 1000 may begin to draw fluid from the hose 101 to start the engine 803. Once started, the engine 803 may re-pressurize the hose 101 such that the system 150 may continue to propel the vehicle 800.

The energy storage system 150 may be used to power the vehicle 800 in reverse. The engine pump 1000 may first draw fluid from the hose 101 in order to start the engine 803 after which the engine 803 may re-pressurize the hose 101, as in the schematic of FIG. 11. Each translation assembly pump 901 may be reversed and the vehicle 800 may be propelled in reverse.

Figure 12:
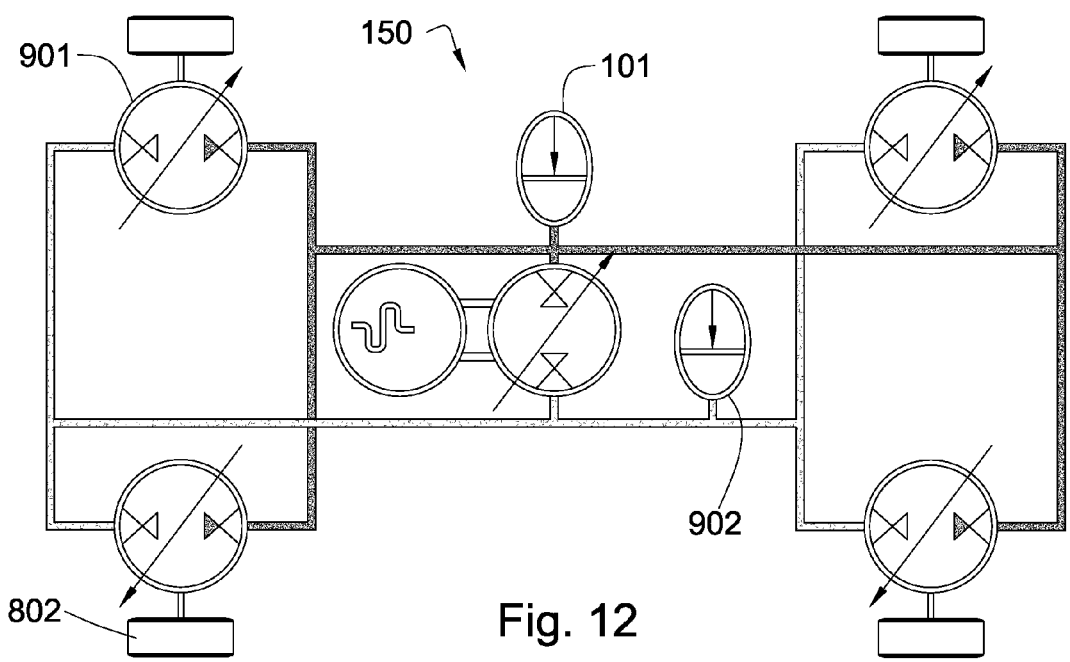
FIG. 12 is a schematic diagram of another embodiment of a hydraulic circuit.

One other important ability of the energy storage system 150 in the vehicle 800 is that of regenerative braking, as in the schematic of FIG. 12. When the vehicle 800 is moving in a forward motion and brakes are applied, the pumps 901 at each translation assembly 802 may be positioned such that fluid is exchanged from the low pressure fluid source 902 to the hose 101. This may allow for the hose 101 to recover at least a portion of the pressure transferred from the hose 101 to the low pressure fluid source 902 resulting from propelling the vehicle 800 forward. Likewise, the same principle may apply when braking while the vehicle 800 is moving in reverse.

Figure 13:
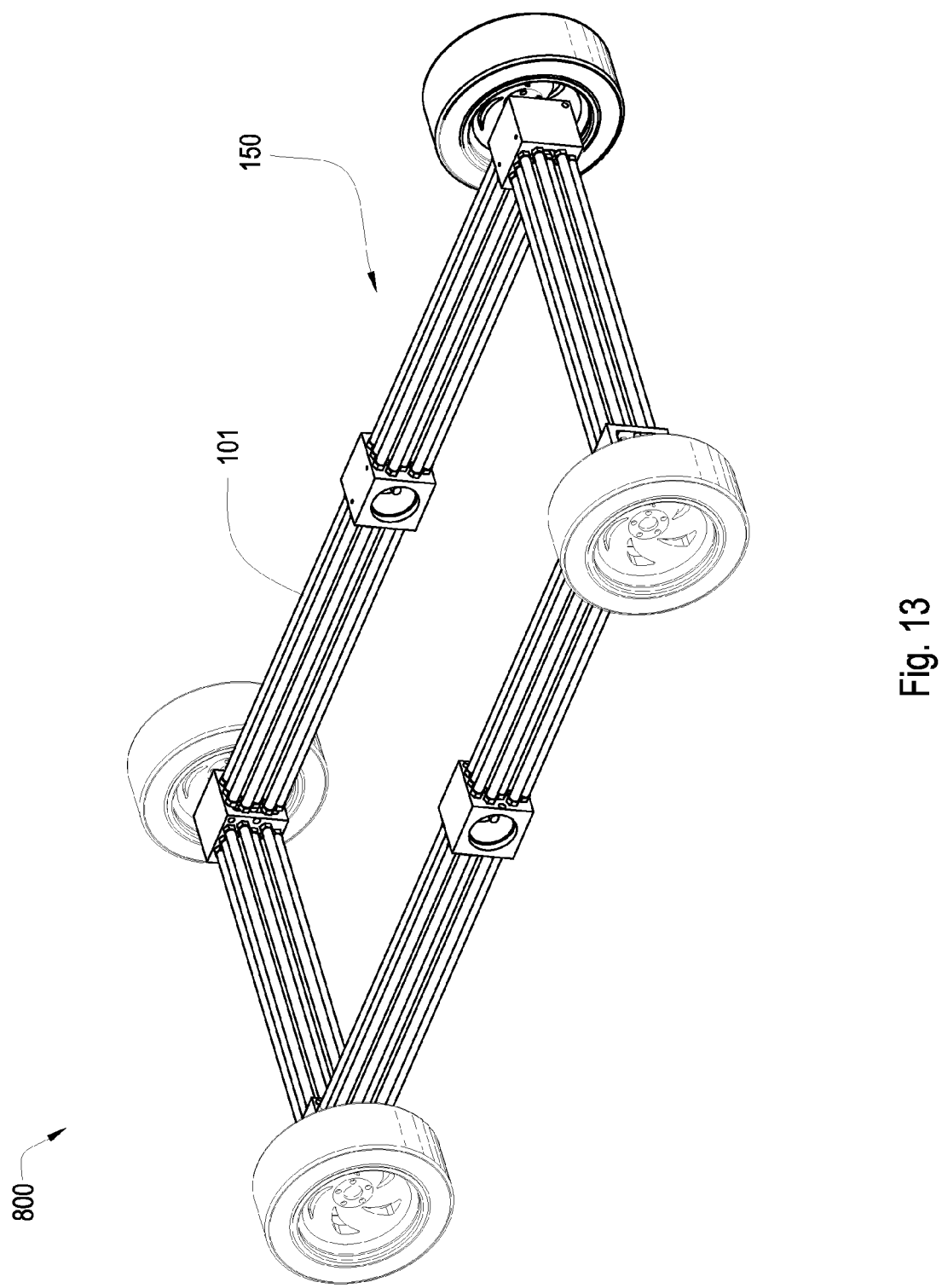
FIG. 13 is a perspective diagram of another embodiment of an automobile.

The energy storage system 150 may comprise a plurality of hoses 101 aligned parallel to one another in a vehicle 800, as in the embodiment of FIG. 13. This alignment may allow air to flow between the hoses 101, which may cool the hydraulic fluid within the hoses 101. In some embodiments, the length of hose 101 may be at least 50 cumulative feet. In other embodiments, the length of hose is over 200 or 400 cumulative feet.

Figure 14:
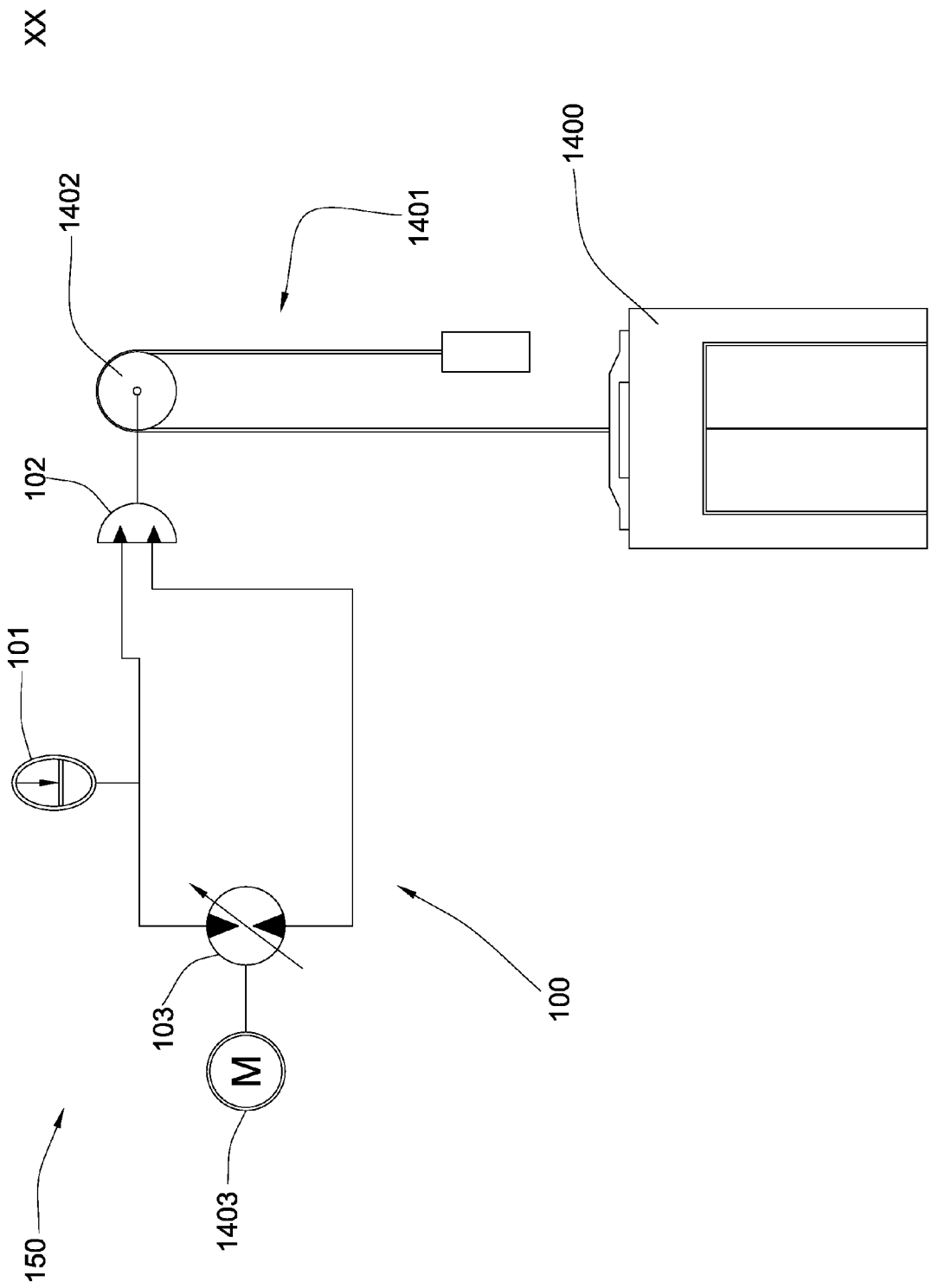
FIG. 14 is a schematic diagram of an embodiment of a hydraulic circuit for operating an elevator.

The energy storage system 150 may be used to operate an elevator 1400, as in the embodiment of FIG. 14. The system 150 may comprise a hydraulic circuit 100 connected to a pulley system 1401 and adapted to operate a pulley 1402 for raising and lowering the elevator 1400. The circuit 100 may comprise an electric motor 1403 for powering a pressurizing mechanism 103 adapted to pressurize a hose 101 in the hydraulic circuit 100. The hose 101 may be in communication with a rotary hydraulic actuator 102. As the elevator 1400 is being raised, the hose 101 may release energy to the actuator 102 to provide more power for lifting the elevator 1400. The rotary actuator 102 may be designed such that as the elevator 1400 is lowered, the pulley 1402 may rotate the actuator 102 in an opposite direction than while the elevator 1400 is being raised, which may help to re-pressurize the hose 101. This may allow for the hydraulic circuit 100 to conserve at least some energy.

Figure 15:
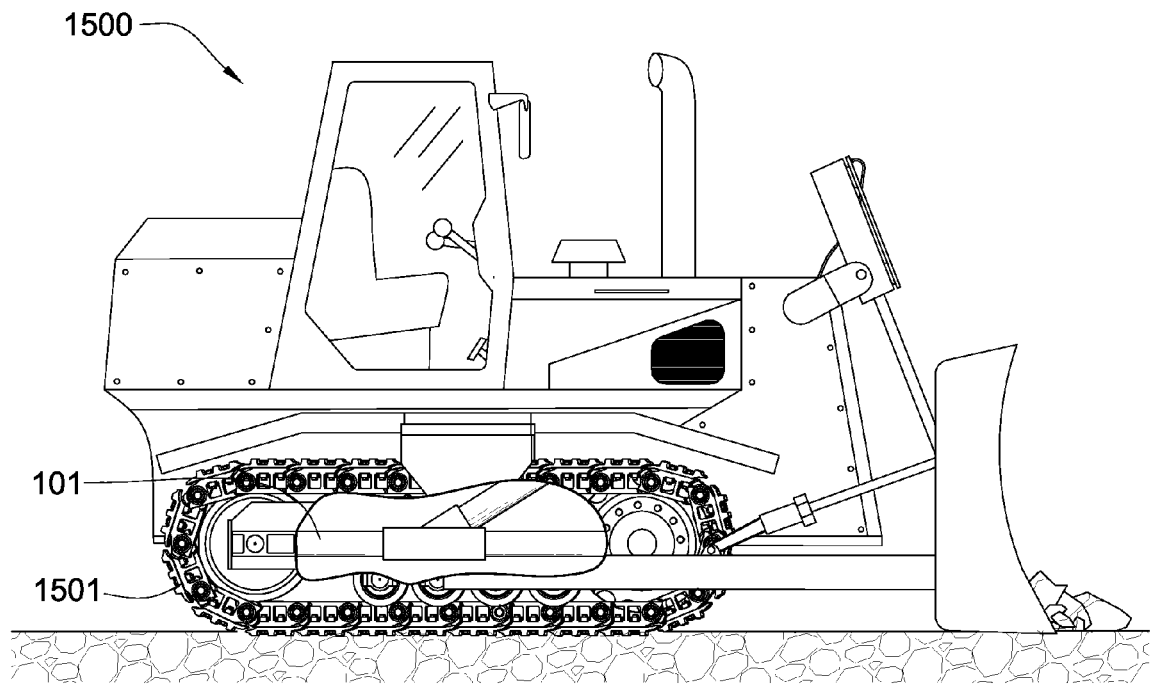
FIG. 15 is an orthogonal diagram of an embodiment of a bulldozer.

The energy storage system 150 may be particularly useful in embodiments where large amounts of force are required for short periods of time. An extra burst of energy from the energy stored in the hose 101 may be useful when peak amounts of energy are required. Referring to FIG. 15, the energy storage system 150 may be used to provide extra energy for a bulldozer 1500. The system 150 may comprise a plurality of hoses 101 that connect to a rotary mechanism that drives the tracks 1501. These hoses may be connected to an engine of the bulldozer which may pressurize the hoses to store over 50 foot pounds of energy.

Figure 16:
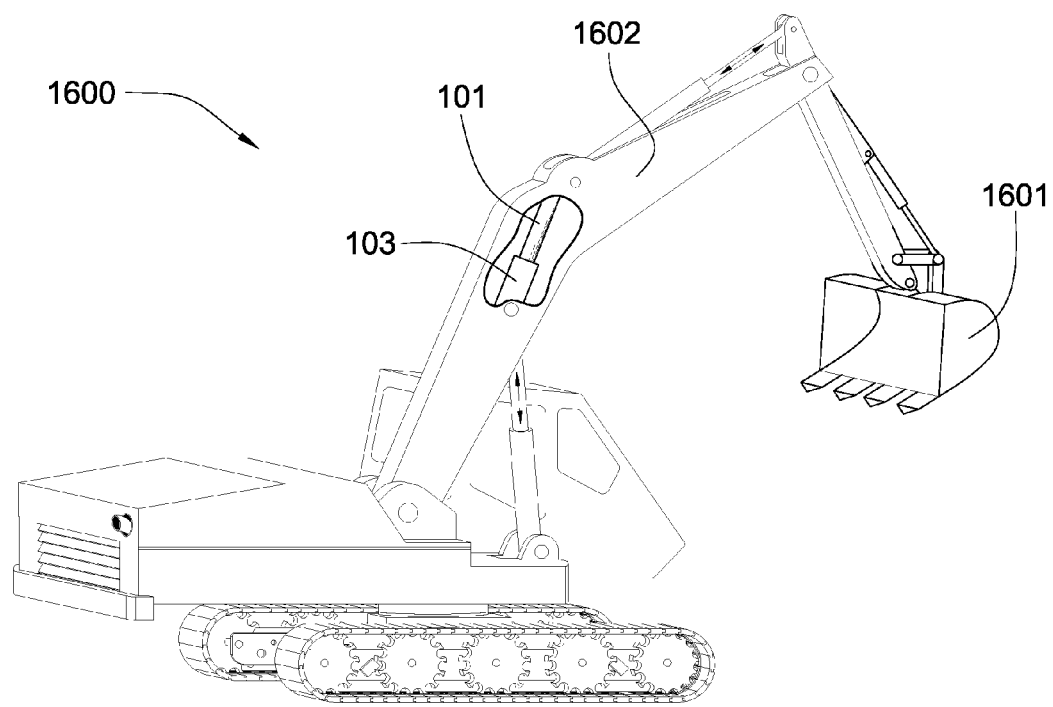
FIG. 16 is a perspective diagram of an embodiment of a backhoe.

Now referring to FIG. 16, the system 150 may provide energy to an articulated arm carrying a bucket 1602 of a backhoe 1600, wherein the pressurizing mechanism 103 and hose 101 may be disposed within the arm 1602. The system 150 may provide additional energy for the bulldozer 1500 or backhoe 1600 when a high amount of initial force is required to lift or move large or heavy loads.

Figure 17:
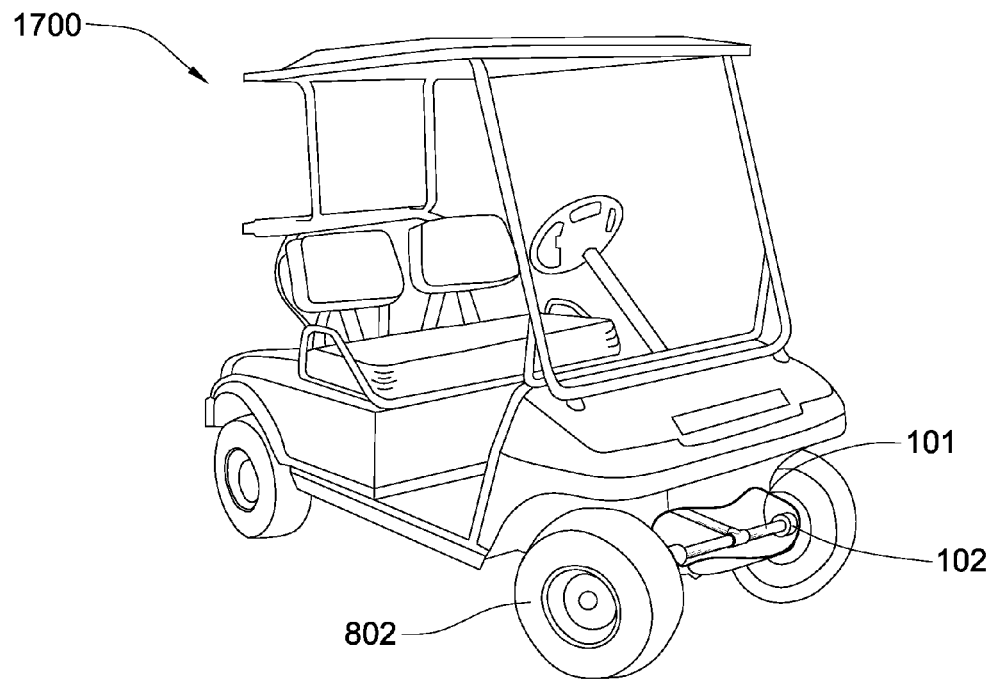
FIG. 17 is a perspective diagram of an embodiment of a golf cart.

The system may also be used in a golf cart 1700, as in the embodiment of FIG. 17. The system may comprise a plurality of hoses 101 in communication with hydraulic actuators 102, such as pump, proximate and in communication with each translation assembly 802.

Figure 18:
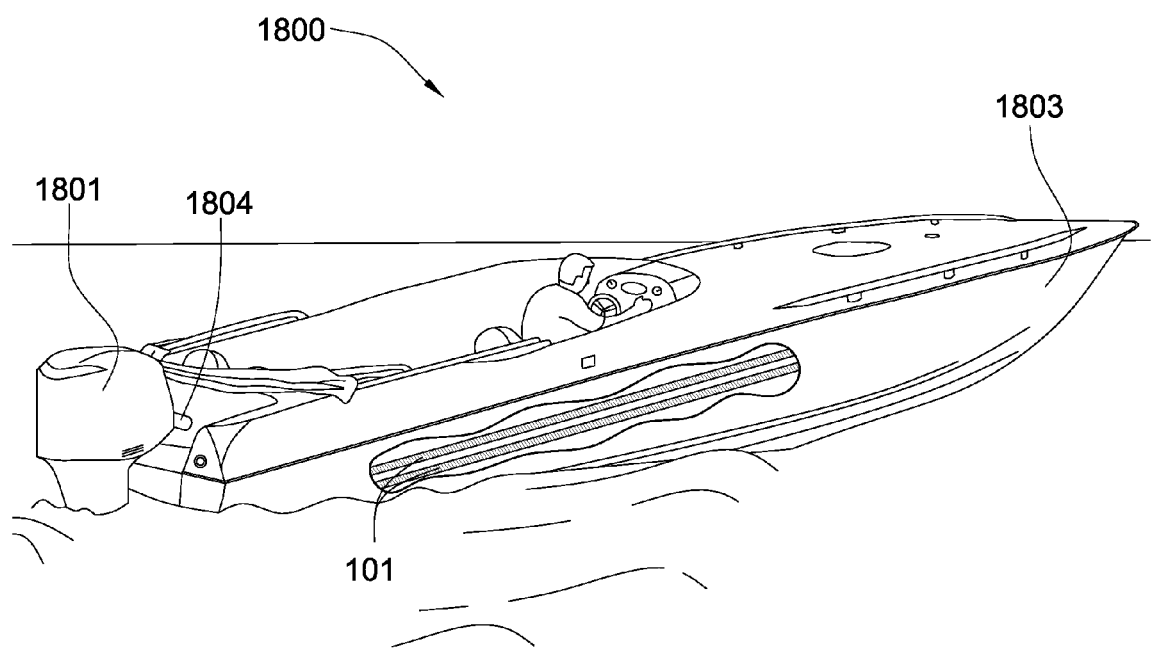
FIG. 18 is a perspective diagram of an embodiment of a boat.

The system may provide extra energy to a motor 1801 of a boat 1800, as in the embodiment of FIG. 18. A plurality of hoses 101 may be disposed within a body 1803 of the boat 1800, with a connecting hose 1804 from the body 1803 to the motor 1801. The system may also provide energy for other vehicles such as trucks, trenchers, milling machines, construction equipment, doom buggies, motorcycles, recreational vehicles, garbage trucks, delivery vehicles, postal vehicles, law enforcement vehicles, bicycles, or a combination thereof. In general the present invention, may be ideal for vehicles which do a lot of starting and stopping such as garbage trucks and delivery vehicles. In some embodiments, a trailer may also incorporate the present invention to aid the vehicle pulling the trailer during acceleration.

Referring to FIG. 19, a method 1900 for performing work may comprise the steps of providing 1905 a hydraulic circuit comprising a length of hose; providing 1910 a hydraulic fluid in the circuit in communication with the hose and with a hydraulic actuator for doing the work; providing 1915 a mechanism for pressurizing the hydraulic circuit; and pressurizing 1920 the hydraulic circuit such that at least 50 foot pounds of energy is stored within the hose to perform the work.

Whereas the present invention has been described in particular relation to the drawings attached hereto, it should be understood that other and further modifications apart from those shown or suggested herein, may be made within the scope and spirit of the present invention.

What is claimed is:

1. A system for performing work, comprising:
   a hydraulic circuit adapted to store at least 50 foot pounds of energy within a length of hose;
   a hydraulic fluid in the circuit in communication with the hose and with a hydraulic actuator for doing the work; and
   a mechanism for pressurizing the hydraulic circuit in order to perform the work;
   wherein the hose is inflated by the hydraulic fluid to over 1,000 psi.

2. The system of claim 1, wherein a material of the hose stores at least 50% of the energy.

3. The system of claim 1, wherein a material of the hose stores at least 75% of the energy.

4. The system of claim 1, wherein the hydraulic fluid is incompressible.

5. The system of claim 1, wherein the hydraulic fluid is compressible.

6. The system of claim 5, wherein at least 10% of the energy is stored in the hydraulic fluid.

7. The system of claim 1, wherein the hydraulic actuator is a rotary mechanism.

8. The system of claim 7, wherein the rotary mechanism comprises a cam shaft, a turbine, a hydraulic motor, a pump, or a combination thereof.

9. The system of claim 1, wherein the hose comprises a material selected from the group consisting of composite material, Kevlar, polyurethane, polyethylene, Twaron, aramid fiber, nylon, rubber, carbon, synthetic polymers, chloroprene, elastomers, polyester, carbon fiber, glass fiber, and a combination thereof.

10. The system of claim 1, wherein the hose comprises a material made of a woven fiber.

11. The system of claim 1, wherein the hose is inflated by the hydraulic fluid to over 5,000 psi.

12. The system of claim 1, wherein the energy is at least 100 foot pounds.

13. The system of claim 1, wherein the energy is at least 500 foot pounds.

14. The system of claim 1, wherein the mechanism for pressurizing the hydraulic circuit is a valve, a motor, a pump, a variable displacement pump, an engine, or a combination thereof.

15. The system of claim 1, wherein the system is incorporated into an automobile.

16. The system of claim 1, wherein the system is incorporated in a golf cart, a truck, an elevator, backhoe, bulldozer, trencher, milling machine, a boat, construction equipment, or a combination thereof.

17. The system of claim 1, wherein the length of hose is at least 50 cumulative feet.

18. The system of claim 1, wherein the hose comprises hose segments.

19. The system of claim 1, wherein the hose comprises a rigid portion.

20. The system of claim 1, wherein the hydraulic actuator comprises a piston.

21. A method for performing work, comprising:
providing a hydraulic circuit comprising a length of hose;
providing a hydraulic fluid in the circuit in communication with the hose and with a hydraulic actuator for doing the work;
providing a mechanism for pressurizing the hydraulic circuit; and
pressurizing the hydraulic circuit to over 1,000 psi such that at least 50 foot pounds of energy is stored within the hose to perform the work.

\* \* \* \* \*